(12) United States Patent
Curtis et al.

(10) Patent No.: US 8,910,420 B2
(45) Date of Patent: Dec. 16, 2014

(54) SLIDING LAVATORY POCKET DOOR

(71) Applicant: The Boeing Company, Chicago, IL (US)

(72) Inventors: Vicki Ann Curtis, Stanwood, WA (US); Lingmiao Wang, Berkeley, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 13/790,915

(22) Filed: Mar. 8, 2013

(65) Prior Publication Data

US 2014/0250792 A1     Sep. 11, 2014

(51) Int. Cl.
*E05D 15/26*     (2006.01)
*E06B 3/46*     (2006.01)

(52) U.S. Cl.
CPC .................................. *E06B 3/4654* (2013.01)
USPC ............................................. 49/125; 49/127

(58) Field of Classification Search
USPC ......... 49/61, 62, 63, 103, 125, 127, 128, 404, 49/372, 323; 160/222, 202, 197, 228
See application file for complete search history.

(56) References Cited

U.S. PATENT DOCUMENTS

| | | | |
|---|---|---|---|
| 643,307 A | | 2/1900 | Schmitt |
| 736,357 A | * | 8/1903 | Brousseau ..................... 160/118 |
| 888,433 A | * | 5/1908 | Thompson ..................... 160/202 |
| 2,378,666 A | * | 6/1945 | Benjamin ....................... 49/372 |
| 2,614,626 A | * | 10/1952 | Garcia ............................ 160/32 |
| 3,430,676 A | * | 3/1969 | Birger ........................... 160/202 |
| 3,698,465 A | * | 10/1972 | Aberg ........................... 160/222 |
| 3,886,851 A | * | 6/1975 | Berner .......................... 454/192 |
| 3,960,196 A | * | 6/1976 | Berner .......................... 160/222 |
| 5,156,195 A | * | 10/1992 | Wehler et al. ................. 160/202 |
| 6,381,904 B1 | * | 5/2002 | Tedescucci ..................... 49/409 |
| 6,640,388 B2 | * | 11/2003 | Covert et al. ................. 16/87 R |
| 7,174,944 B1 | * | 2/2007 | Clark et al. ................... 160/197 |
| 7,299,852 B1 | * | 11/2007 | Chuang et al. ................ 160/197 |
| 7,568,857 B2 | * | 8/2009 | Riotto ............................... 404/6 |

(Continued)

FOREIGN PATENT DOCUMENTS

| | | |
|---|---|---|
| EP | 1859710 | 11/2007 |
| WO | 2008047997 | 4/2008 |

OTHER PUBLICATIONS

Search Report dated Jun. 4, 2014 in co-pending EP Patent Application No. 14155754.6.

*Primary Examiner* — Katherine Mitchell
*Assistant Examiner* — Shiref Mekhaeil
(74) *Attorney, Agent, or Firm* — Evans & Dixon, LLC; Joseph M. Rolnicki

(57) ABSTRACT

A compact, sliding door apparatus includes three vertically curved panels positioned in a doorway. A first of the panels is solid and is operatively connected to a slot above the doorway enabling the first panel to move side to side in the doorway. The second of the panels is hollow and receives a portion of the first panel. The second panel is also operatively connected to the slot above the doorway for side to side movement of the panel across the doorway. A third of the panels has a hollow interior and is stationary adjacent the doorway. The third panel hollow interior receives a portion of the second panel. The doorway is opened by moving the first panel into the second panel interior to open a portion of the doorway, and then moving the second panel into the third panel interior to fully open the doorway.

12 Claims, 8 Drawing Sheets

(56) References Cited

U.S. PATENT DOCUMENTS 8,297,334 B2 * 10/2012 Chu .............................. 160/222
2007/0261799 A1 * 11/2007 Chu .............................. 160/197
2011/0272104 A1 * 11/2011 Dimitrakoudis .............. 160/188
2011/0315822 A1    12/2011 Fairchild

* cited by examiner

SLIDING LAVATORY POCKET DOOR

FIELD OF THE INVENTION

The present invention pertains to a compact, sliding door apparatus for an aircraft doorway. In particular, the present invention pertains to a compact, sliding door apparatus comprised of three vertically curved panels positioned in a doorway of an aircraft, for example a lavatory doorway. A first of the panels is solid and is operatively connected to a slot above the doorway enabling the first panel to move side-to-side in the doorway. A second of the panels has a hollow interior that receives a portion of the first panel. The second panel is also operatively connected to the slot above the doorway enabling the second panel to move side-to-side across the doorway. A third of the panels has a hollow interior and is stationary at a position adjacent the doorway. The hollow interior of the third panel receives a portion of the second panel. To open the doorway the first panel is moved into the interior of the second panel to open a portion of the doorway, and then the second panel is moved into the interior of the third panel to fully open the doorway. The sliding door apparatus of the invention is easier to operate than bifold doors often employed in aircraft lavatory doorways and also does not obstruct an adjacent aisle of the aircraft because it does not open into the aisle. In addition, the vertically curved configuration of the apparatus panels bow out into the aisle and provide additional space in the lavatory.

BACKGROUND

Commercial aircraft set up for the transportation of passengers typically include rows of seats along the length of the aircraft cabin that are separated by a central aisle or aisles, and at least one lavatory in the aircraft cabin.

The typical passenger aircraft lavatory is accessed through a doorway from the central aisle. Some aircraft lavatories have doors that pivot out from the doorway into the aisle when opening the doorway. The lavatory door pivoting out into the aisle becomes an obstruction to passengers and crew members walking along the aisle. Some aircraft lavatories have bifold doors. The bifold doors do not pivot out into the aisle, but fold into the lavatory when opening the door. The folding movement of the door often makes the door difficult to open. Additionally, the door folding inwardly into the cramped lavatory interior often makes it difficult for a person to enter the lavatory and then close the door.

SUMMARY

The compact, sliding door apparatus of the present invention overcomes disadvantages associated with prior art aircraft lavatory doors by not pivoting out into the aisle of the aircraft and not folding into the cramped interior of the aircraft lavatory when opening the door apparatus. It is also more intuitive to use and provides the feel of more space.

The compact, sliding door apparatus is basically comprised of a pair of slots extending straight across a doorway above and below the doorway, for example an aircraft lavatory doorway, and three vertically curved panels that bow outwardly away from the lavatory interior and thereby increase the volume of the lavatory interior.

A first of the curved panels is solid. A pair of first guides extend upwardly from the first curved panel and into the slot above the doorway. An additional pair of guides extend from the bottom of the first curved panel into the slot across the bottom of the doorway. The guides engage in the slots for sliding movement of the guides along the slots and thereby operatively connect the first curved panel with the slots for side-to-side movement of the first curved panel across the doorway.

The second curved panel has a hollow interior and an opening in one side to the interior. A pair of second guides extend upwardly from the second curved panel and into the slot above the doorway. An additional pair of second guides extend into the slot below the doorway. The second guides are movable along the slots and thereby operatively connect the second curved panel with the slots for side-to-side movement of the second curved panel across the doorway. The first curved panel extends through the opening in the side of the second curved panel and into the interior of the second curved panel. Side-to-side movement of the first curved panel in the doorway moves a portion of the first curved panel through the interior of the second curved panel.

The third curved panel is adjacent the doorway and is stationary. The third curved panel has a hollow interior and an opening in one side to the interior. The second curved panel extends through the third curved panel opening and into the interior of the third curved panel. Side-to-side movement of the second curved panel in the doorway moves a portion of the second curved panel through the interior of the third curved panel.

To open the compact, sliding door apparatus from a closed condition across the doorway, the first curved panel is first manually moved toward the second panel. This causes the portion of the first curved panel in the second panel interior to move through the interior and also opens a portion of the doorway. Continued manual movement of the first curved panel across the doorway results in at least one of the first guides of the first curved panel coming into engagement with at least one of the second guides of the second curved panel. Continued manual movement of the first curved panel across the doorway causes the engaging first guide to push against the second guide and thereby move the second curved panel across the doorway toward the third curved panel. The movement of the second panel across the doorway results in the portion of the second panel in the third panel interior to move through the interior of the third panel and also further opens the doorway. The second curved panel is moved into the interior of the third curved panel to its fullest extent and the first curved panel is moved into the interior of the second curved panel to its fullest extent, resulting in the opening of the doorway.

To close the doorway the first curved panel is manually pulled from the interior of the second curved panel and moved across a portion of the doorway. Continued manual pulling of the first curved panel results in at least one of the first guides of the first curved panel engaging with at least one of the second guides of the second curved panel. The engaging guides cause the second curved panel to be pulled from the interior of the third curved panel and across the doorway as the first curved panel is continued to be manually pulled across the doorway. When the first curved panel is pulled to its furthest extent from the interior of the second curved panel, and the second curved panel is pulled to its furthest extend from the interior of the third curved panel the doorway is closed.

DESCRIPTION

Figure 1:
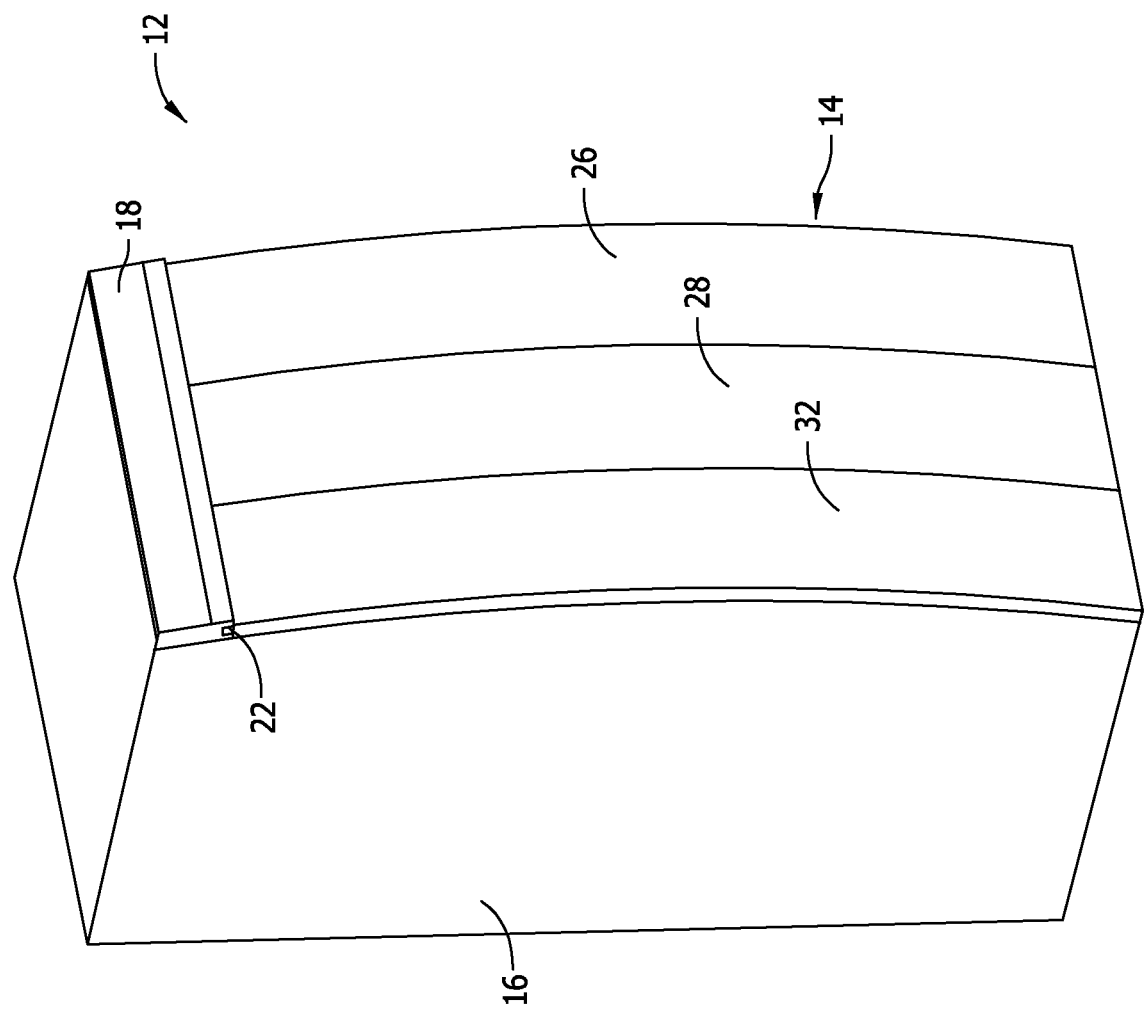
FIG. 1 is a perspective view of the compact, sliding door apparatus of the invention employed on an aircraft lavatory.

FIG. 1 is a perspective view of the compact, sliding door apparatus 12 of the present invention. In FIG. 1 the sliding door apparatus 12 is shown employed in the doorway 14 of a lavatory enclosure 16, for example for an aircraft. A rail 18 extends over the doorway. Due to the compact, sliding operation of the apparatus 12 and the vertically curved configuration of panels of the apparatus which will be described, the apparatus is ideally suited for use in the doorway of an aircraft lavatory due to the restricted area of the lavatory interior and airplan

259 e aisles. However, it should be understood that the compact, sliding door apparatus 12 of the invention may be employed in other doorways where the features of the apparatus are desirable.

Figure 2:
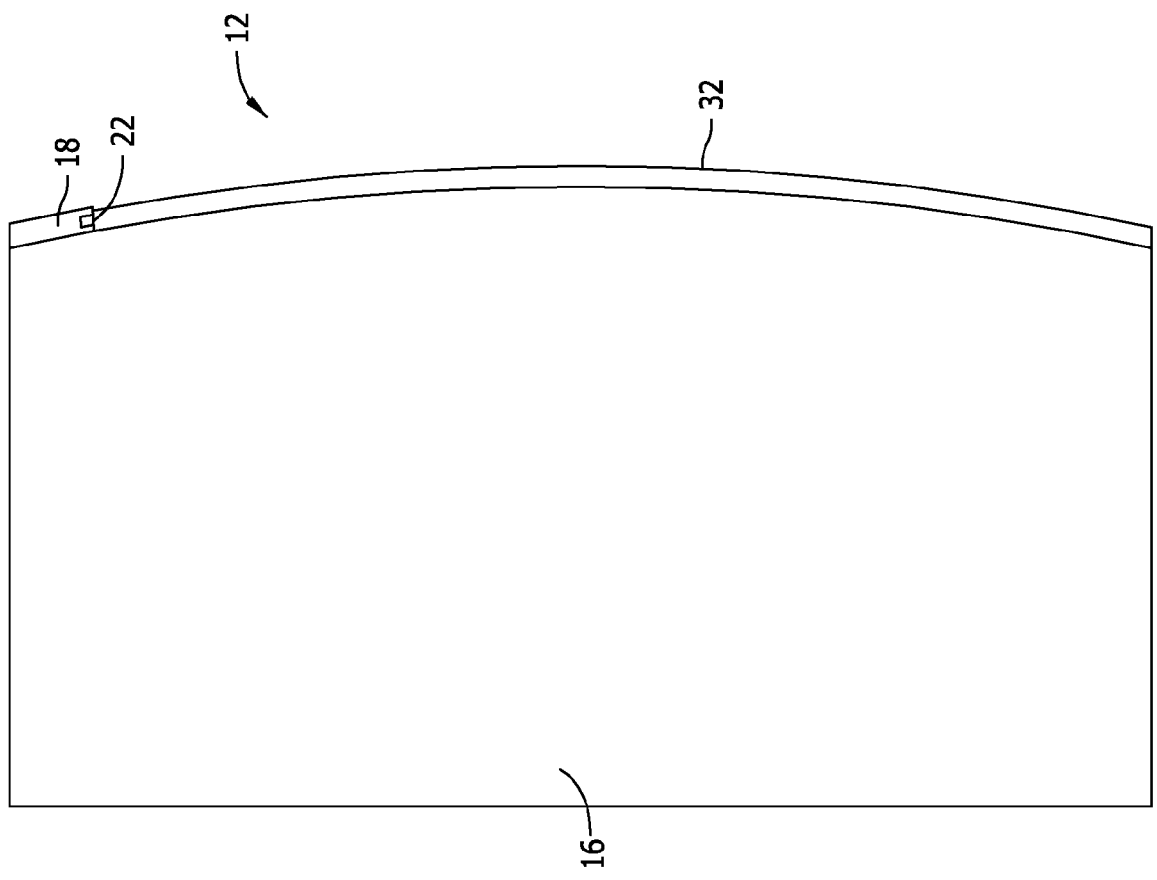
FIG. 2 is a side elevation view of the apparatus.
Figure 5:
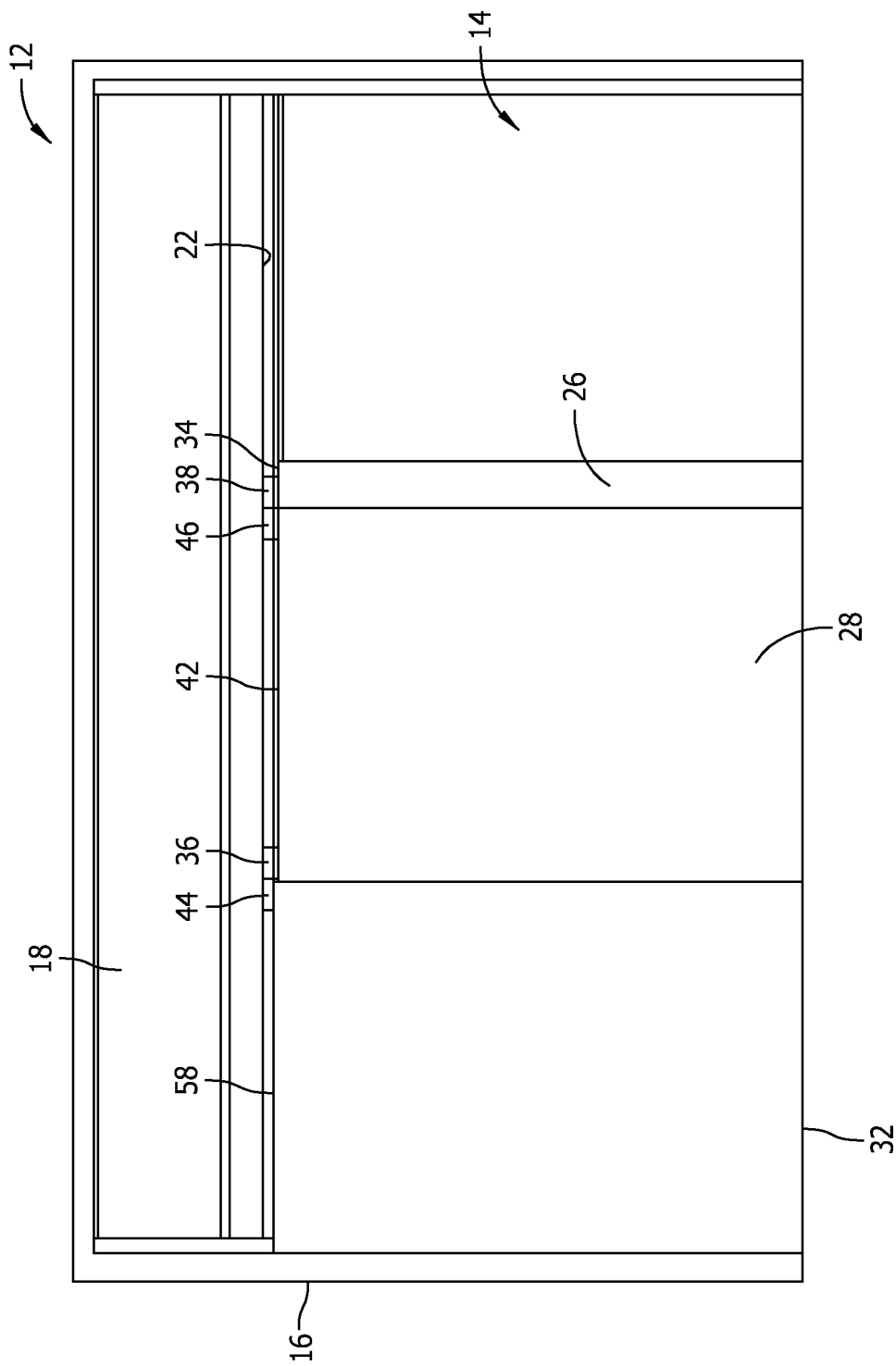
FIG. 5 is a view similar to that of FIG. 3, but showing an initial stage of moving the apparatus to its open condition.
Figure 6:
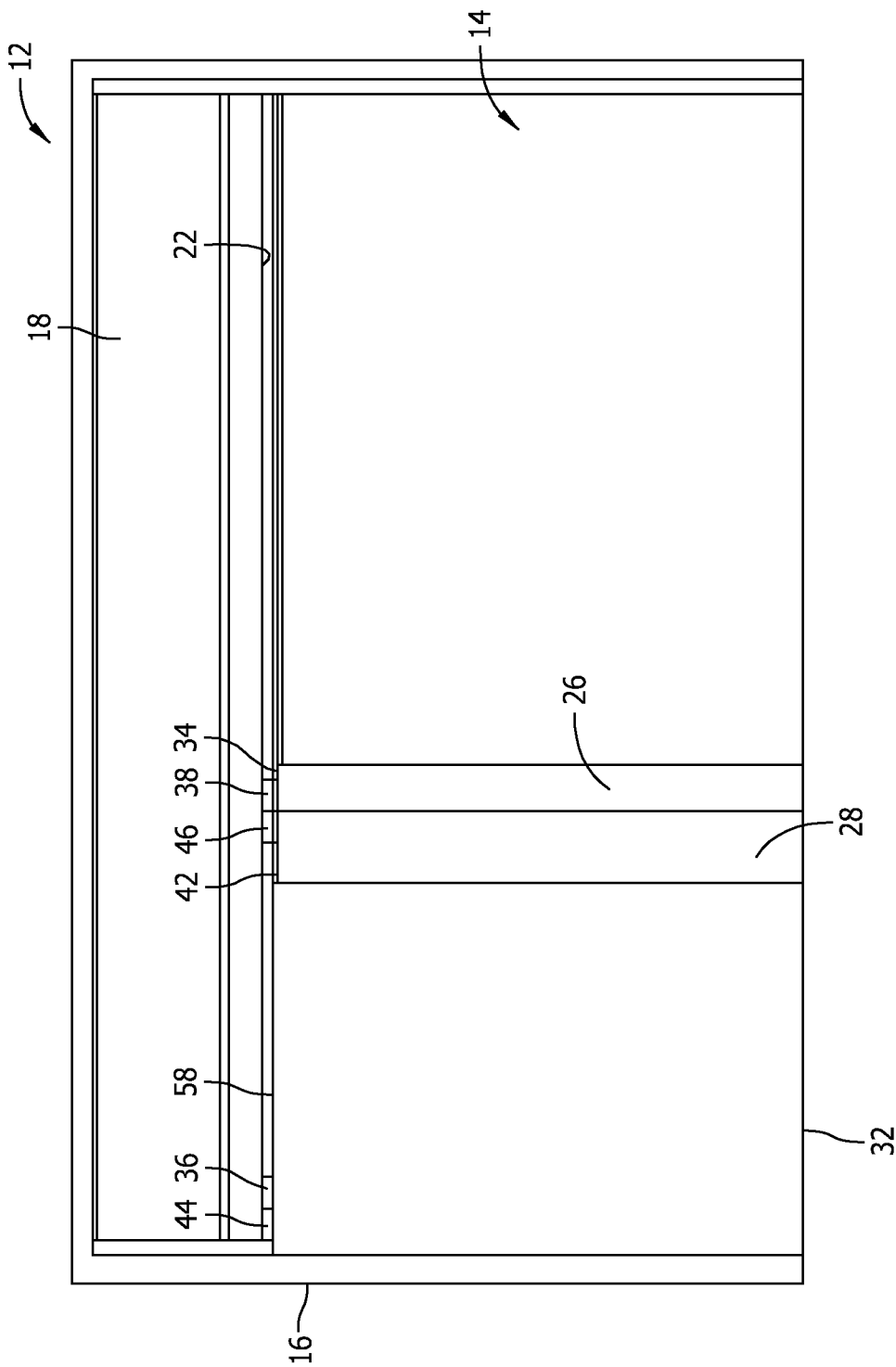
FIG. 6 is a view similar to that of FIG. 5, but showing the apparatus moved to its opened condition.
Figure 7:
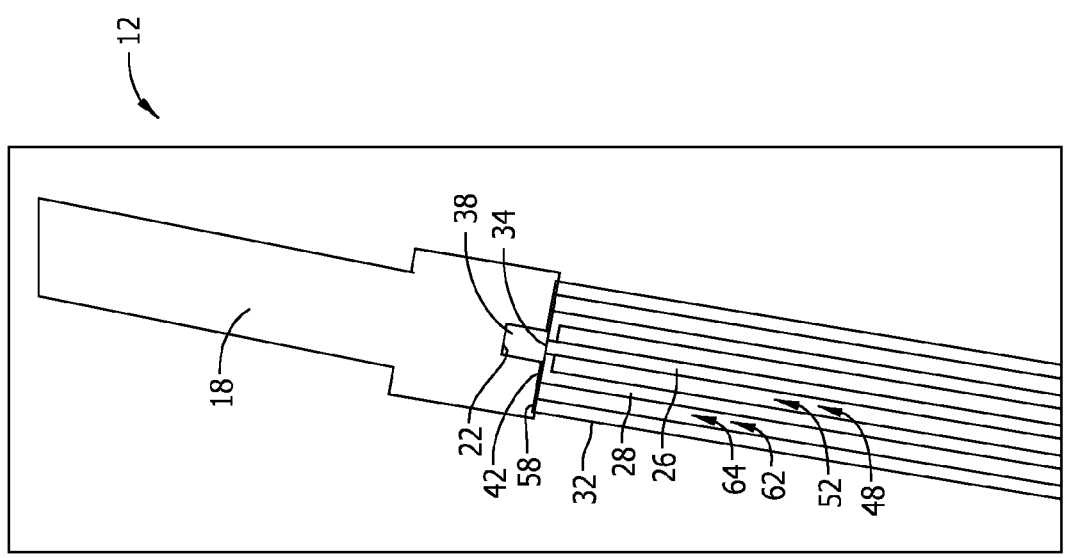
FIG. 7 is a partial cross-section view of the apparatus.

The compact, sliding door apparatus 12 is basically comprised of a pair of slots 22 that extend straight across the doorway 14. One of the slots 22 is recessed into the rail 18 above the doorway 14 and the other of the slots is positioned below the doorway. Because the slots are mirror images and are basically the same, only the upper slot 22 will be further described herein. FIG. 2 is a side elevation view of the lavatory enclosure 16 and the compact, sliding door apparatus 12. An enlarged view of the upper slot 22 is shown in FIG. 7. In FIGS. 2-7 it can be seen that the upper slot 22 is basically an inverted, generally U-shaped channel. The slot 22 extends straight across the top of the doorway 14 as shown in FIGS. 3-6.

Additionally, the compact, sliding door apparatus is comprised of three vertically curved panels 26, 28, 32. Two of the panels 26, 28 are operatively connected to the slots 23, 24 for sliding movement. As can be seen in FIG. 1, the panels 26, 28, 32 bow outwardly away from the doorway 14 and thereby increase the interior volume of the lavatory enclosure 16.

A first of the curved panels 26 has a generally rectangular configuration. A vertical height dimension of the panel 26 is larger than a horizontal width dimension of the panel. The panel 26 has a narrow thickness dimension as shown in FIG. 7. The panel 26 is solid and can be constructed of a plastic or other similar, lightweight, rigid material. As shown in FIG. 1, the panel 26 is curved vertically with the panel 26 bowing outwardly away from the doorway 14 and the interior of the lavatory enclosure 16. This increases the area in the interior of the lavatory enclosure 60. The first panel 26 has a straight top edge 34 that extends parallel with and slightly below the upper slot 22. A pair of first guides 36, 38 extend upwardly from opposite sides of the first panel top edge 34 and into the upper slot 22. The first guides 36, 38 engage in the upper slot 22 for sliding movement of the guides along the slot. The guides 36, 38 thereby operatively connect the first curved panel 26 with the slot 22 for side to side movement of the first curved panel 26 across the doorway 14. The first guides 36, 38 are represented in the drawing figures as having block shaped configurations that project outwardly from the opposite ends of the panel top edge 34. In other embodiments of the apparatus the guides 36, 38 could have other configurations. For example, the guides 36, 38 could employ rollers or other similar means to facilitate the sliding movement of the guides 36, 38 through the slot 22. Although not shown in the drawing figures, an additional pair of guides that are mirror images of the first guides 36, 38 extend from the bottom of the first curved panel 26 and into the lower slot.

The second curved panel 28 also has a generally rectangular configuration with a vertical height dimension that is larger than a horizontal width dimension. The second panel 28 has a thickness dimension that is slightly larger than that of the first panel 26 as can be seen in FIG. 7. As shown in FIG. 1, the second curved panel 28 is also vertically curved and has substantially the same curvature and radius of curvature as the first curved panel 26. The second panel 28 also has a straight top edge 42 that extends parallel with and slightly below the upper slot 22. A pair of second guides 44, 46 extend upwardly from opposite ends of the second panel top edge 42 and into the upper slot 22. An additional pair of second guides (not shown) extend into the slot below the doorway. The second guides 44, 46 engage in the upper slot 22 for sliding movement of the guides along the slot and thereby operatively connect the second curved panel 28 with the upper slot 22 for side to side movement of the second curved panel across the doorway 14. Although not shown in the drawing figures, an additional pair of guides that are mirror images of the second guides 44, 46 extend from the bottom of the second panel 28 into the lower slot.

Figure 8:
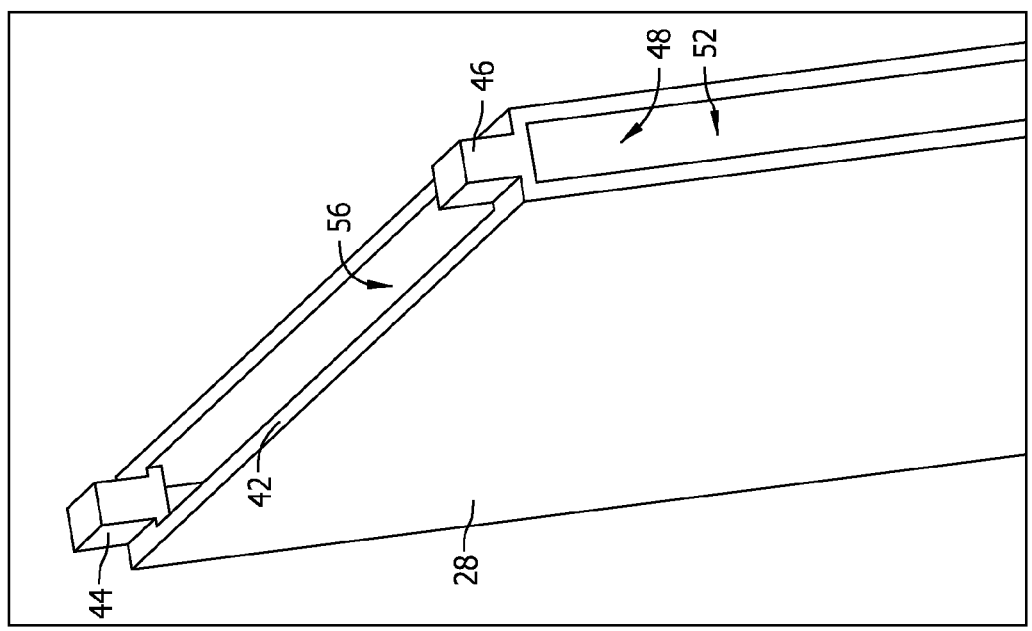
FIG. 8 is a partial perspective view of the top of the second panel of the apparatus.

The second curved panel 28 has a construction that differs from the first curved panel 26 in that the second curved panel 28 has a hollow interior 48. Additionally, the second curved panel 28 has an elongate, curved opening 52 in a side of the panel adjacent the first curved panel 26. The side opening 52 is dimensioned to enable a portion 54 of the first curved panel 26 to pass through the opening 52 and into the second curved panel hollow interior 48. Additionally, the second curved panel 28 has an elongate, opening 56 in the top edge 52 of the panel. As can be seen in FIG. 8, the top opening 56 extends across the second panel top edge 42 between the second guides 44, 46. The second panel top opening 56 allows the left first guide 36 of the first curved panel 26 as viewed in the drawing figures to extend upwardly from the portion 54 of the first curved panel in the second panel interior 48 through the top opening 56 and into the upper slot 22. The left first guide 36 is positioned in the slot 22 between the left second guide 44 and the right second guide 46, and the right second guide 46 is positioned in the slot 22 between the left first guide 36 and the right first guide 38. Thus, as the left first guide 36 slides through the upper slot 22 when the first curved panel 26 is moved side to side in the doorway 14, the left first guide 36 is also moving along the top opening 56 in the second curved panel 28. The length of the second panel top opening 56 and the dimensions of the second panel hollow interior 48 enable the first panel 26 to be moved to the left as viewed in FIGS. 3-6 into the second panel hollow interior 48 until the left and right first guides 36, 38 of the first curved panel 26 come into contact with the respective left and right second guides 44, 46 of the second curved panel 28. This engagement of the guides stops the leftward movement of the first curved panel 26 relative to the second curved panel 28. However, the first curved panel 26 can still be moved further to the left relative to the upper slot 22. Further leftward movement of the first curved panel 26 relative to the upper slot 22 and across the doorway 14 will then cause leftward movement of the second curved panel 28 relative to the upper slot 22 and across the doorway 14. This is due to the engagement of the first guides 36, 38 with the second guides 44, 46. The leftward movement of the first guides 36, 38 pushes the second guides 44, 46 to the left through the upper slot 22 and pushes the second panel 28 to the left across the doorway.

The third curved panel 32 also has a generally rectangular configuration. A vertical height dimension of the panel 32 is larger than a horizontal width dimension of the panel. The thickness dimension of the third curved panel 32 is larger than that of the first curved panel 26 and the second curved panel 28 as represented in FIG. 7. The vertical curvature of the third panel 32 and the radius of curvature of the third panel 32 are substantially the same as that of the first panel 26 and the second panel 28. The third curved panel 32 is positioned adjacent the right side of the doorway 14 and below the upper slot 22. The panel 32 is fixed stationary in this position. A straight top edge 58 of the third curved panel 32 extends parallel with the upper slot 22 and is secured to the rail 18. Like the second curved panel 28, the third curved panel 32 also has a hollow interior 62. The panel also has an elongate, curved opening 64 in the side of the third curved panel 32 adjacent the second curved panel 28. The side opening 64 of the third panel is dimensioned to enable a portion 68 of the second curved panel 28 to pass through the opening 64 and into the third curved panel hollow interior 62. Additionally, the third curved panel 32 has an elongate, opening 72 in the top edge 58 of the panel. The third panel top opening 72 is aligned with the slot 22 in the rail 18 and extends completely across the third panel top edge 58. The left second guide 44 of the second curved panel 28 extends through the top opening 72 of the third curved panel 32 and into the upper slot 22. Leftward movement of the second curved panel 28 in the doorway 14 causes the portion 68 of the second panel in the third curved panel interior 48 to move leftward into the third panel interior 38. The leftward movement of the second panel 28 also causes the left second guide 44 to move to the left through the third panel top opening 72 and through the upper slot 22.

Figure 3:
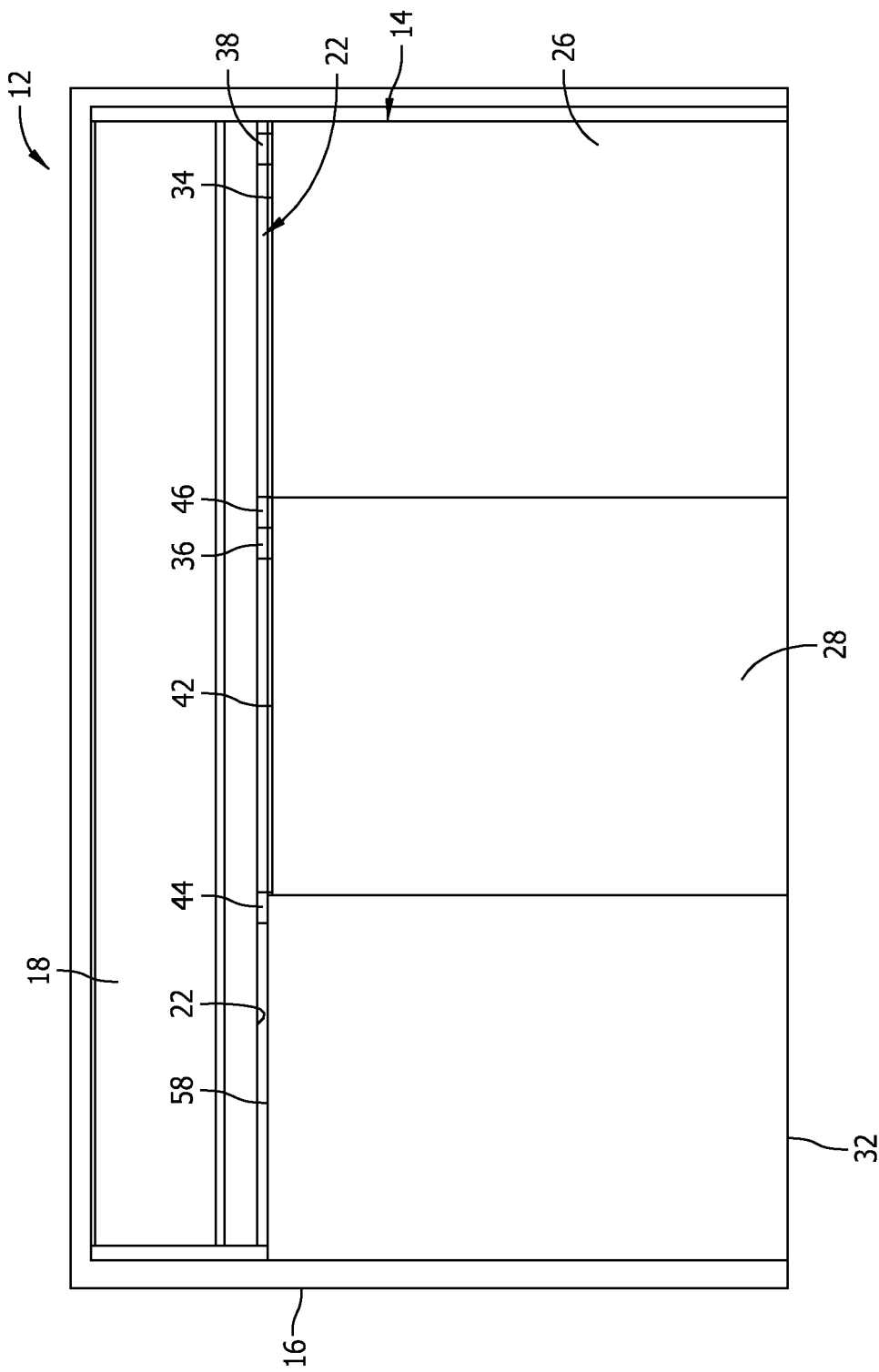
FIG. 3 is a partial front elevation view of the apparatus in the closed condition.
Figure 4:
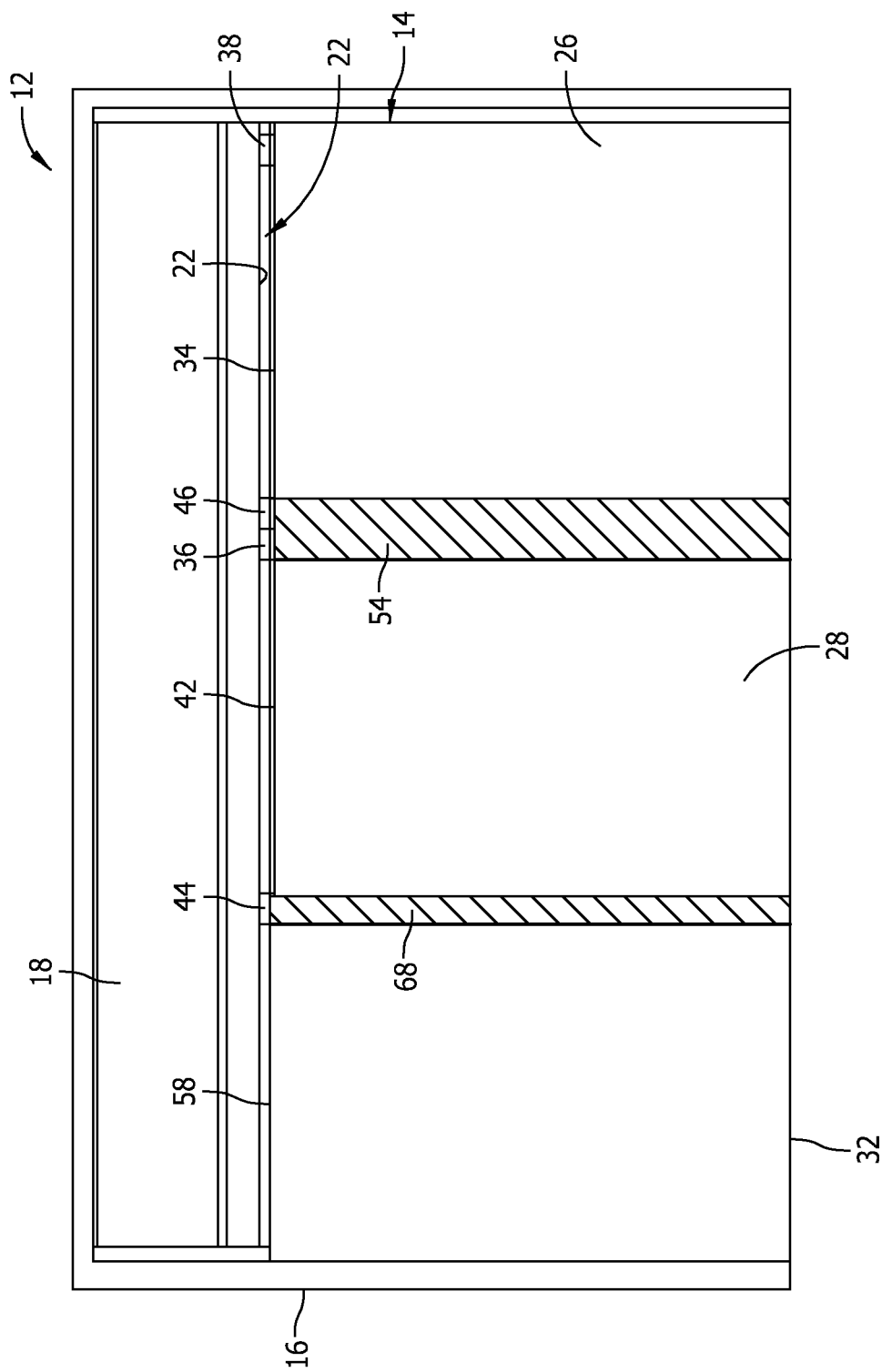
FIG. 4 is a view similar to that of FIG. 3, but showing the extent of overlap of the panels of the apparatus.

FIG. 3 shows the relative positions of the first 26, second 28, and third 32 curved panels in the closed condition of the compact, sliding door apparatus 12. To open the sliding door apparatus 12 from the closed condition across the doorway 14, the first curved panel 26 is first manually moved to the left as viewed in FIG. 3. This causes the first guides 36, 38 to slide through the upper slot 22 to the left. The guides direct the first panel portion 54 in the second panel interior 48 to move to the left through the interior. This movement of the first panel 26 opens a portion of the doorway 14. Continued manual movement of the first curved panel 26 to the left across the doorway 14 results in substantially all of the first curved panel 26 being moved into the second curved panel hollow interior 48. The first panel 26 is moved into the second panel interior 48 until the first guides 36, 38 come into contact with the respective second guides 44, 46 as represented in FIG. 5. Continued manual movement of the first curved panel 26 to the left across the doorway 14 causes the left first guide 36 to push the left second guide 44 to the left through the upper slot 22 and causes the right first guide 38 to push the right second guide 46 to the left through the upper slot 22. This in turn causes the second panel portion 68 in the third panel hollow interior 62 to move to the left through the interior. This also causes further opening of the doorway 14. Continued manual movement of the first curved panel 26 to the left causes continued movement of the second curved panel 28 to the left through the third panel hollow interior 62 until the left second guide 44 comes to the end of the upper slot 22 and the doorway 14 is completely opened as represented in FIG. 6.

To close the doorway 14 the above procedure is reverse. The first curved panel 26 is manually pulled to the right from the interior of the second curved panel 28 and is moved across a portion of the doorway 14. Continued manual pulling of the first curved panel results in the left first guide 36 coming into contact with the right second guide 46. Further pulling of the first curved panel 26 to the right across the doorway 14 causes the left first guide 36 to push the right second guide 46 to the right through the upper slot 22. This in turn causes the second curved panel 28 to be pulled to the right out of the third panel interior 62 and across the doorway 14. When the first curved panel 26 is pulled to its furthest extent from the second panel interior 48, and the second curved panel 28 is pulled to its furthest extent from the third curved panel interior 62, the doorway 14 is closed.

As various modifications could be made in the construction of the invention herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by any of the above described exemplary embodiments, but should be defined only in accordance with the following claims appended hereto and their equivalents.

The invention claimed is:

1. A method for installing a compact, sliding door assembly in a doorway, the method comprising:

positioning a slot adjacent the doorway with the slot extending straight across the doorway;

positioning a first curved panel having a first top edge and a first pair of guides extending upwardly directly from the first top edge in the doorway with the first top edge positioned directly vertically underneath the slot;

positioning a second curved panel having a second top edge and a second pair of guides extending upwardly directly from the second top edge in the doorway with the second top edge positioned directly vertically underneath the slot;

inserting the second pair of guides into the slot for movement of the guides through the slot and thereby operatively connecting the second curved panel with the slot for side-to-side movement of the second curved panel across the doorway;

inserting the first pair of guides into the slot for movement of the guides through the slot and thereby operatively connecting the first curved panel with the slot for side-to-side movement of the first curved panel across the doorway;

providing the second curved panel with a hollow interior and a side opening in a side of the second curved panel, dimensioning the hollow interior and the side opening to enable the first curved panel to extend through the side opening and move through the hollow interior when moving the first curved panel side-to-side in the doorway;

inserting the first curved panel through the second curved panel side opening and into the second curved panel hollow interior when positioning the first curved panel in the doorway;

providing the second curved panel with a top opening with one guide of the first pair of guides is extending upwardly directly from the first top edge of the first curved panel through the top opening of the second curved panel and into the slot with the one guide of the first pair of guides positioned in the slot between the second pair of guides positioned in the slot where on moving the first curved panel toward the second curved panel the one guide of the first pair of guides is moved along the slot until the one guide of the first pair of guides comes into contact with one guide of the second pair of guides and on continued moving of the first curved panel toward the second curved panel the one guide of the first pair of guides pushes the one guide of the second pair of guides along the slot and moves the second curved panel relative to the slot.

2. The method of claim 1, further comprising:
positioning a third curved panel adjacent the doorway;
providing the third curved panel with a hollow interior and an opening in a side of the third curved panel, dimensioning the hollow interior and opening of the third curved panel to enable the second curved panel to extend through the opening and move through the hollow interior of the third curved panel when moving the second curved panel side-to-side in the doorway.

3. The method of claim 1, further comprising:
when inserting the first pair of guides into the slot, inserting the one guide of the first pair of guides into the slot between the second pair of guides; and,
inserting a second guide of the first pair of guides into the slot with a guide of the second pair of guides being positioned in the slot between the one guide and the second guide of the first pair of guides.

4. The method of claim 1, further comprising:
positioning the slot above the doorway.

5. A compact, sliding door apparatus in a doorway, the apparatus comprising:
a slot adjacent the doorway, the slot extending across the doorway;
a first curved panel in the doorway, the first curved panel having a first top edge directly vertically underneath the slot and a first guide extending upwardly directly from the first top edge into the slot for movement of the first guide through the slot, the first guide thereby operatively connecting the first curved panel with the slot for side-to-side movement of the first curved panel relative to the slot and across the doorway;
a second curved panel in the doorway, the second curved panel having a second top edge directly vertically underneath the slot and a second guide extending upwardly directly from the second top edge into the slot for movement of the second guide through the slot, the second guide thereby operatively connecting the second curved panel with the slot for side-to-side movement of the second curved panel relative to the slot and across the doorway;
the second curved panel having a hollow interior and a side opening in a side of the second curved panel, the first curved panel extending through the side opening and into the hollow interior of the second curved panel and the first curved panel moving in the hollow interior of the second curved panel when the first curved panel is moved side-to-side in the doorway;
the second curved panel having a top opening and the first guide is extending upwardly directly from the first top edge of the first curved panel through the top opening of the second curved panel and into the slot, the first guide being positioned in the slot relative to the second guide where moving the first curved panel toward the second curved panel moves the first guide along the slot until the first guide comes into contact with the second guide and on continued moving of the first curved panel toward the second curved panel the first guide pushes the second guide along the slot and moves the second curved panel relative to the slot.

6. The apparatus of claim 5, further comprising:
a third curved panel adjacent the doorway, the third curved panel having a hollow interior and a side opening in a side of the third curved panel adjacent the doorway, the second curved panel extending through the side opening of the third curved panel and into the hollow interior of the third curved panel and the second curved panel moving in the hollow interior of the third curved panel when the second curved panel is moved side-to-side in the doorway.

7. The apparatus of claim 6, further comprising:
the hollow interior of the second curved panel being dimensioned to receive more than half of the first curved panel in the hollow interior of the second curved panel; and,
the hollow interior of the third curved panel being dimensioned to receive more than half of the second curved panel in the hollow interior of the third curved panel.

8. The apparatus of claim 5, further comprising:
the hollow interior of the second curved panel being dimensioned to receive more than half of the first curved panel in the interior of the second curved panel.

9. The apparatus of claim 5, further comprising:
the first and second curved panels being curved vertically.

10. The apparatus of claim 5, further comprising:
the first and second curved panels being rectangular and having a same vertical height dimension.

11. The apparatus of claim 5, further comprising:
the first curved panel having a pair of first guides that extend directly upward from the first top edge into the slot for movement of the first guides through the slot;
the second curved panel having a pair of second guides that extend directly upwardly from the second top edge into the slot for movement of the second guides through the slot;
one of the pair of first guides is positioned in the slot between the pair of second guides; and,
one of the pair of second guides is positioned in the slot between the pair of first guides.

12. The apparatus of claim 5, further comprising:
the slot being above the doorway and extending straight across the doorway.

* * * * *